Aug. 27, 1935.　　G. F. FORSTHOEFEL　　2,012,262
REFRIGERATION APPARATUS
Filed Nov. 22, 1933
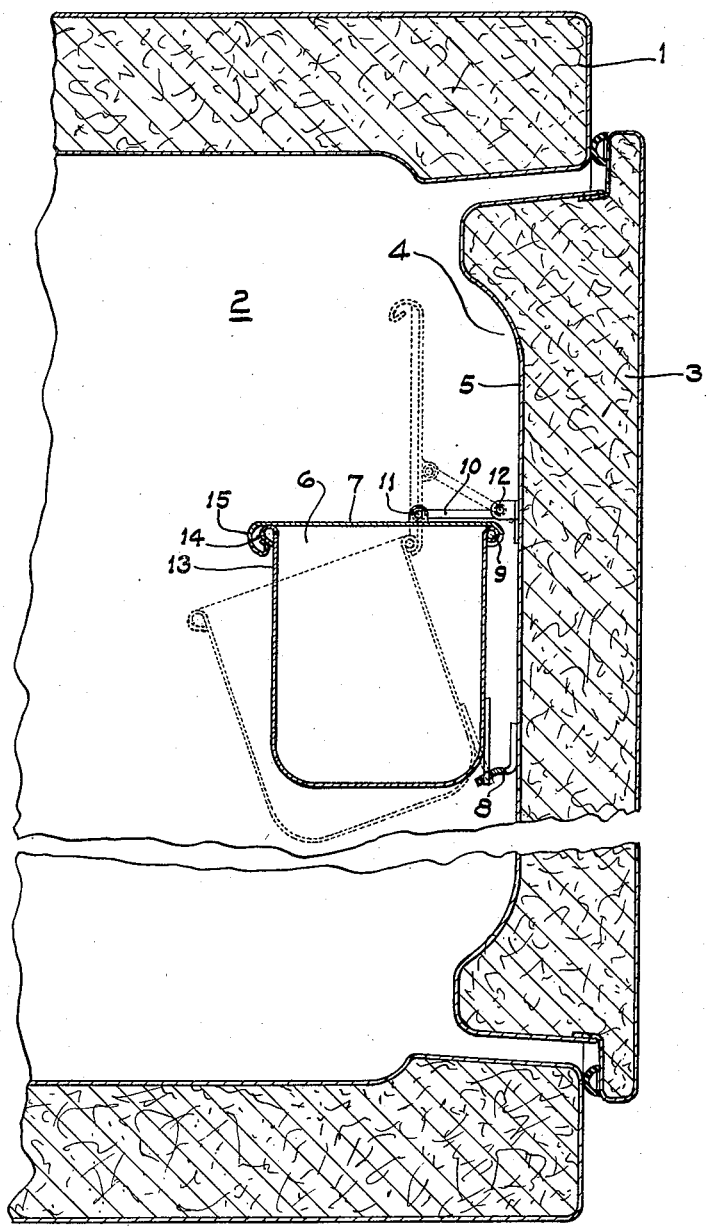
WITNESSES:
James H. Mosser
W. M. Van Siver
INVENTOR
GREGG F. FORSTHOEFEL
BY
ATTORNEY Patented Aug. 27, 1935

2,012,262

UNITED STATES PATENT OFFICE 2,012,262

REFRIGERATION APPARATUS

Gregg F. Forsthoefel, Springfield, Mass., assignor to Westinghouse Electric & Manufacturing Company, East Pittsburgh, Pa., a corporation of Pennsylvania Application November 22, 1933, Serial No. 699,219

3 Claims. (Cl. 62—89)

My invention relates to refrigeration apparatus of the mechanical type used for domestic purposes and has for an object the provision of a readily accessible crisping pan within the refrigerator cabinet.

Crisping pans are utilized for the cold storage of foods from which it is desirable to prevent the removal of moisture, and usually comprise a pan and a closure therefore which prevents rapid circulation of refrigerated air in the pan. The crisping pan is usually supported detachably or slidably by a shelf in a refrigerator cabinet. In order to gain access to the crisping pan when so disposed, it must be removed from the refrigerator cabinet, or pulled forwardly of the shelf on which it is disposed. In addition, the crisping pan utilizes considerable space in the cabinet which may be used to advantage for other storage purposes.

I have, therefore, as an object of my invention to provide a crisping pan mounted on the inner side of the food storage compartment door. The inner face of the door is preferably recessed to provide additional space in the cabinet, and the crisping pan is at least partially mounted in the recess thus formed.

A further object is to provide a crisping pan, which is preferably attached to the door in such a manner that the pan is tilted forwardly when the crisping pan closure is opened, so that access is easily obtained thereto.

Referring to the drawing, the single figure thereof is a sectional view of a refrigerator cabinet showing a preferred embodiment of my invention.

In the drawing, I have shown a portion of a refrigeratior cabinet 1 including a food storage compartment 2 having a door 3 provided with a recess 4 in an inner door pan 5. Mounted on the inner door pan preferably partially within recess 4 is a crisping pan 6 which may be of any usual and well-known construction and which is provided with a closure member 7. The pan 6 is rigidly supported from the inner door pan 5 by a hinge device 8. The pan closure member 7 is rotatably mounted to the pan 6 by means of a hinge 9. A linkage member 10 is hinged at 11 to the pan closure member 7, and is also hinged at 12 to the inner door pan 5. The outer wall 13 of the pan 6 is provided with a turned portion 14 along the edge thereof, and the pan closure 7 is also provided with a turned portion 15 at the edge thereof to cooperate with the turned portion 14 to latch the pan in its closed position, the pan closure 7 being formed of relatively light gauge metal, the edge of which has sufficient resiliency to perform the latching function.

When the householder desires to gain access to the crisping pan 6, the pan closure member 7 is unlatched and is raised to the position shown in dotted lines in the drawing, rotating about hinges 11 and 12 of member 10. The pan 6, therefore, tilts forwardly about the hinge 8 a distance determined by the length of the connecting member 10, whereupon the interior of the crisping pan is in the direct range of the user's sight.

From the foregoing, it will be seen that I have provided a crisping pan for use in mechanical refrigeration apparatus which is readily accessible and which is so positioned on the door of the refrigerator cabinet that space is conserved in the refrigerator cabinet.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. Refrigeration apparatus including a refrigerated food compartment having an access opening therein, a door for closing the opening, a crisping pan disposed in said compartment and comprising a storage member and a closure therefor, means for rotatably connecting the storage member and closure together, means for rotatably fastening the storage member to the door, and means for rotatably fastening the closure member to the door, said rotatable connecting means being so arranged that when the closure member is rotated to open the storage member, the storage member tilts away from the door whereby easy access thereto is effected.

2. Refrigeration apparatus including a refrigated food compartment having an access opening therein, a door for closing the opening, a crisping pan disposed in said compartment and comprising a storage member and a closure therefore, means for rotatably connecting the storage member and closure together at one side thereof, latching means at another side thereof for normally maintaining the closure member in closed position, means for rotatably fastening the closure member to the food compartment door, and means disposed adjacent the bottom of the storage member for rotatably fastening the storage member to the door, said rotatable connecting means being so arranged that, when the latching means is released and the crisping pan closure is raised to the open position, the storage member tilts a predetermined distance forwardly of the door about its rotatable fastening means, whereby easy access thereto is effected.

3. In refrigeration apparatus, the combination of a refrigerator cabinet embodying a food compartment having an access opening therein, a door for closing the access opening, a food storage container disposed in said compartment and embodying a closure therefor, means for rotatably connecting the container and closure together, means for rotatably supporting the container within the food compartment, and means for rotatably supporting the closure member within the food compartment, said rotatable connecting means being so arranged that when the closure member is rotated to open the container, the container is tilted forwardly to afford ready access thereto.

GREGG F. FORSTHOEFEL.